May 12, 1925.                                                1,537,615
E. C. McCONNELL
FOOD HOLDER FOR BIRD CAGES
Filed April 17, 1924
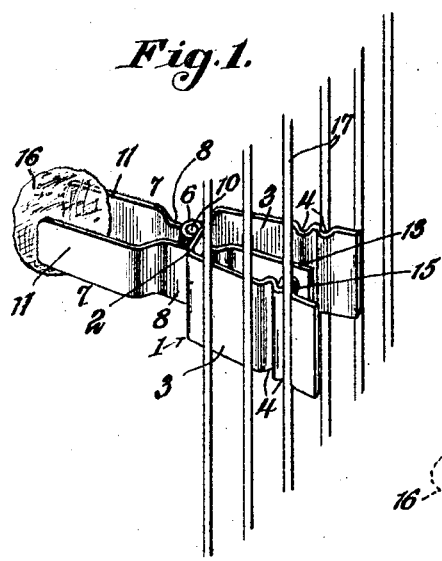
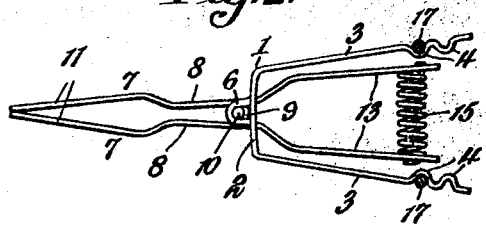
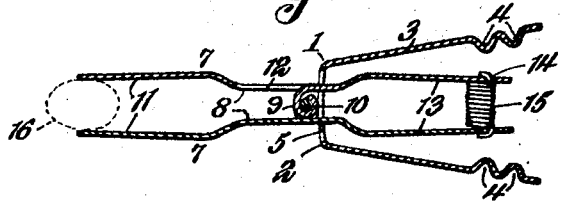
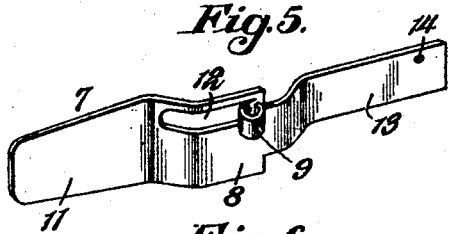
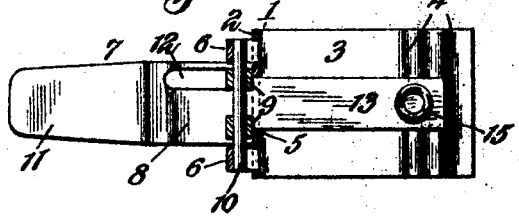
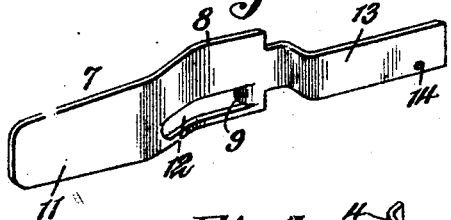
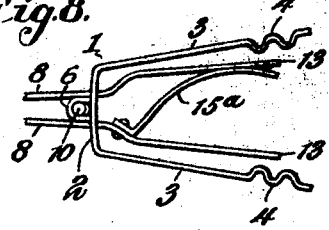
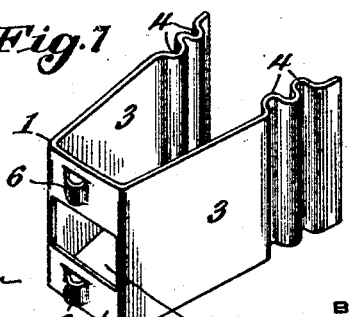
E. C. McConnell,
INVENTOR.
WITNESSES
BY
ATTORNEY Patented May 12, 1925.

1,537,615

UNITED STATES PATENT OFFICE.

EDMOND CLARK McCONNELL, OF RICHMOND, CALIFORNIA.

FOOD HOLDER FOR BIRD CAGES.

Application filed April 17, 1924. Serial No. 707,180.

*To all whom it may concern:*

Be it known that I, EDMOND CLARK MC-CONNELL, a citizen of the United States, residing at Richmond, in the county of Contra Costa and State of California, have invented a new and useful Food Holder for Bird Cages, of which the following is a specification.

This invention relates to food holders for bird cages.

The object is to provide a simple, strong and durable device for holding different kinds of food for birds, the device having means for engagement with the food, and having other means which may be readily placed between the vertical bars of the cage, so as to support the same at any desired elevation or location and facilitate reaching the food by the bird while standing on a perch or swing, or from other positions.

A final object is to provide a food holder which may be operated to receive the food, such as fruits, vegetables, crackers, cuttlebone or the like, by merely pressing the thumb and forefinger together, which action also contracts the means for introduction between the cage bars, when, by a slight lessening of such pressure the food may be clamped and the device positioned in the cage, and, upon further releasing the pressure, the holder will frictionally engage the bars and remain in position while the food is being taken therefrom.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a perspective view of the food holder in position between the bars of a bird cage.

Figure 2 is a top plan view thereof, the parts being in normal position.

Figure 3 is a horizontal section, the food holding jaws being open.

Figure 4 is a vertical, longitudinal section through the device.

Figure 5 is a detail perspective view of one of the food holding jaws.

Figure 6 is a similar view of the other jaw.

Figure 7 is a detail perspective view of the body member for engaging the bars of the cage.

Figure 8 is a detail plan view of a modified form of pressure spring for clamping the jaws.

The common custom of inserting foods, especially fruits and vegetables of a juicy nature between the bars of brass or other metal bird cages, often results in the discoloration and corroding of the same, and frequently the fruit is loosened from its position and falls upon the bottom of the cage to be thereafter ignored by the bird.

The present invention is designed to overcome these disadvantages by providing means for effectually holding the food in a manner to be entirely consumed and also prevented from falling from its position.

To this end the device comprises a body member 1 formed, preferably of thin sheet brass having sufficient spring for the purpose, said body member being formed of an elongated strip bent intermediately to form a front wall 2, and diverging, terminal arms 3 extending rearwardly and provided near their free ends with transverse corrugations or indentations 4. The front wall is provided with a central, rectangular opening 5 defining upper and lower bars, each of which is horizontally slitted and pressed outwardly to form pintle eyes 6.

Opposed clamping jaws 7, each formed of a strip of similar metal though somewhat narrower than the body member, extend through the opening 5 of the latter, and are provided with inwardly-extending offset portions 8 at their centers, said portions being provided each with an eye 9 which, when the said jaws are in positon, aline with the eyes 6 of the body member, so as to receive a hinge pintle 10 to permit the said jaws to be freely swung about the same.

The offset portions 8 provide ample space at the opening 5 to permit the jaws to move sufficiently to grasp a maximum size piece of food, and the front exposed ends 11 of the same are preferably tapered and normally approach each other and contact at the points, as shown in Figure 2. The eyes 9 are formed preferably by slitting the metal of the offset portions 8, as shown at 12, to provide elongated, longitudinally disposed tongues which are bent to form said eyes 9. One of the eyes 9 of one jaw is located near the top edge thereof, while the eye of the other jaw is located near the bottom edge thereof, so as not to interfere with each other when positioned on the pintle 10.

The rear ends of the jaws beyond the offsets 8 are somewhat reduced in width to provide outwardly or rearwardly diverging arms 13 which extend back nearly as far as the free ends of the arms 3 of the body member, and the pairs of arms 13 and 3 are substantially parallel when in normal position.

The arms 13 are provided near their free ends with apertures 14 for the hook ends of an expansile coiled spring 15, which hold the arms 13 apart and the front ends 11 in contact when there is no food between the jaws; at which time the free ends of the arms 13 are adjacent to the inner faces of the arms 3 of the body member. A leaf spring 15$^a$ may be employed in lieu of the coiled form as shown in Figure 8.

By pressing inwardly on the arms 3 between the thumb and forefinger, the said arms are caused to engage the arms 13 and to separate the front ends 11 of the jaws to receive food, as indicated at 16 in Figure 3. The spring 15 is thus compressed, and upon releasing the arms 13 somewhat, the said spring will cause the clamping action on the food, when the body member may be introduced between the bars 17 of a bird cage which bars are then seated within a pair of the opposite indentations 4, and the hand may be removed from the device and the same will remain rigidly fixed in position with the food independently clamped in position for the bird to consume the same. The arms 3 are sufficiently resilient to retain the device in its position between the bars 17, and the reduced ends 11 of the jaws permit the food to be nearly all exposed for consumption.

From the foregoing it will be seen that a simple and easily operated food holding device has been provided, which will support the food in a manner to expose the same to the bird, and that the device may be placed in any desired position on the cage for the purpose, said device being clean and sanitary.

What is claimed is:

1. A device of the class described comprising a compressible body member having means for engagement with the bars of a gage when expanded, and spring-closed jaws mounted within the body member so as to be opened when said body member is compressed.

2. In a device of the class described, the combination with a compressible body member having means for engagement with the bars of a cage, jaws pivoted to the said member at an intermediate point of their length, said jaws extending forwardly from said member to provide gripping means for the article of food to be held, and extending rearwardly between the sides of said member so as to be opened when the body member is compressed, and spring means located at the rear end of said jaws.

3. A food holding attachment for bird cages comprising a body member having a front wall and rearwardly-extending resilient arms provided with seats for the bars of a bird cage, opposed arms pivoted in the front wall and extending forwardly to constitute food-engaging jaws and rearwardly between the arms of the body member to be engaged by the latter when compressed to open the jaws, and a spring interposed between the rear ends of the arms of the jaws to cause the food to be clamped.

4. A food holding attachment for bird cages comprising a resilient, sheet-metal body member having a front wall provided with an opening and rearwardly-extending, diverging arms having transverse indentations for engagement with the bars of a cage, eyes formed in the front wall above and below said opening, a pair of opposed jaws extending through the opening and each having an intermediate eye registering with the aforesaid eyes, a pintle traversing the several eyes, the rear ends of the jaws diverging correspondingly between the arms of the body member, and an expansile spring mounted between the said rear ends to resist opening the active ends of the jaws when the arms of the body member are compressed.

In testimony that I claim the foregoing as my own, I have hereto affixed my signature.

EDMOND CLARK McCONNELL.